INVENTOR
DUANE O. CULLIGAN

Feb. 4, 1958
D. O. CULLIGAN
2,821,905
POWER DRIVEN ROTARY SPIT
Filed April 16, 1954
2 Sheets-Sheet 2
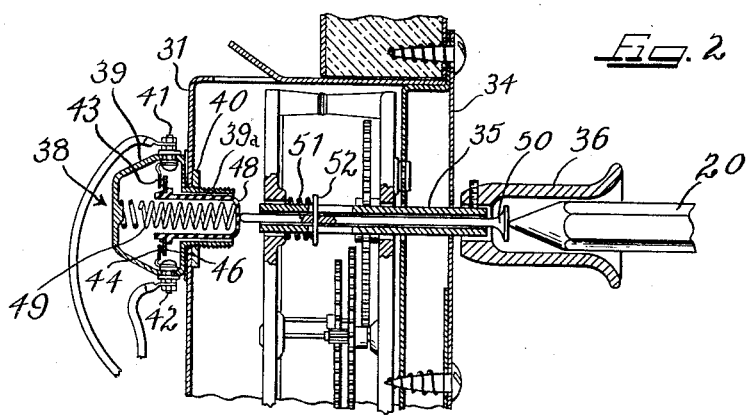
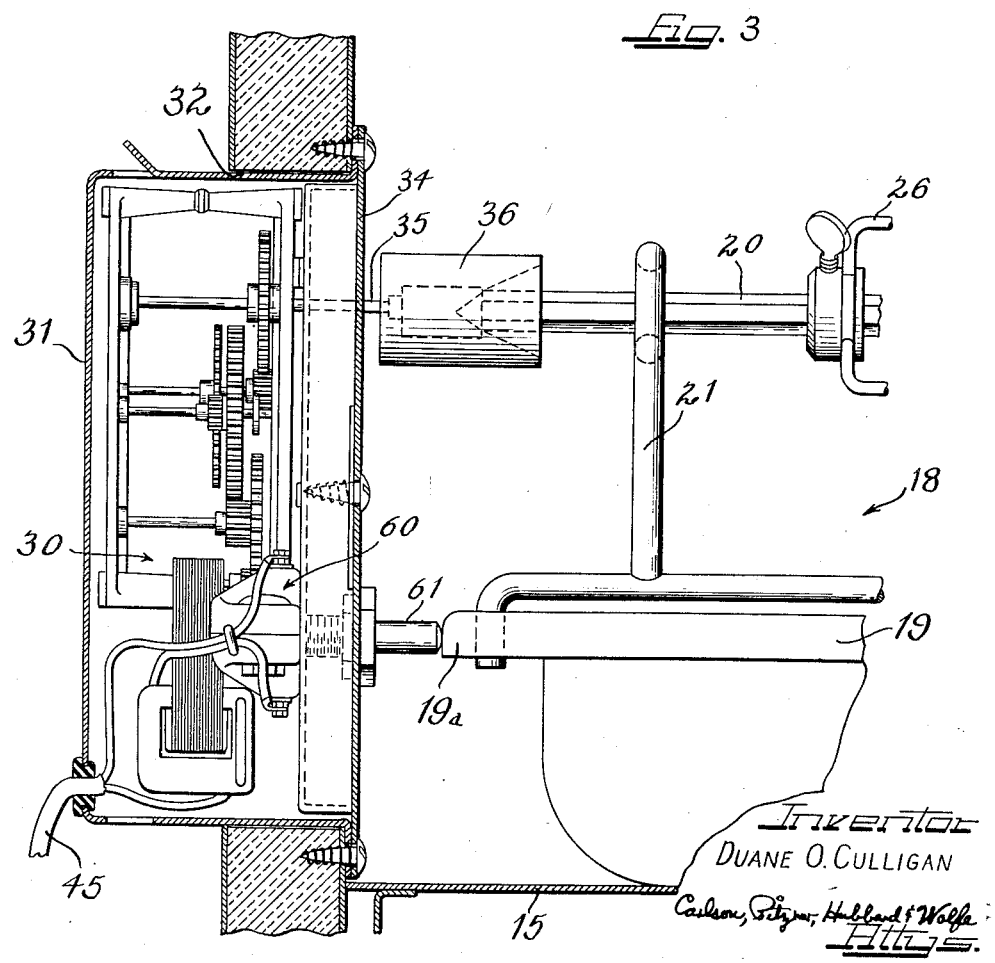
Inventor
DUANE O. CULLIGAN

United States Patent Office 2,821,905
Patented Feb. 4, 1958

2,821,905
POWER DRIVEN ROTARY SPIT

Duane O. Culligan, Kankakee, Ill., assignor to Florence Stove Company, Gardner, Mass., a corporation of Massachusetts Application April 16, 1954, Serial No. 423,592

1 Claim. (Cl. 99—421)

The present invention relates to spits for holding meat or other articles of food to be cooked in an oven or the like. More particularly, the invention pertains to spits rotatably driven by electric motors so as to enable uniform cooking of food on the spit without constant attendance or manual operation.

It is the general aim of the invention to provide a rotary spit assembly of the type described above in which the spit is drivingly engaged or disengaged with the motor and the motor is energized or de-energized as an incident to the spit being respectively inserted into or withdrawn from the oven.

In an ancillary sense, it is another object of the invention to eliminate the possible consequences of the user's forgetfulness or failure to turn the driving motor on when the spit is placed in the oven or off when the spit is removed from the oven by accomplishing such control automatically. Thus, on the one hand, the possibility of food being burned on one side while in the oven is prevented, and on the other hand, the possibility of the motor running needlessly, for perhaps hours, after the spit and food have been removed from the oven is prevented.

A further object is the provision of such a spit assembly which is readily employed as an optional attachment with the broiler oven of a domestic stove.

Still another object is the provision of such a power-driven spit assembly utilizing a unit, including a drip pan and a spit rotatably carried above it, in which the drip pan and spit may be stored in the oven when not in use without energizing the electric drive motor.

Other objects and advantages will become apparent as the following description proceeds, taken in conjunction with the accompanying drawings, in which:

Fig. 2 is an enlarged fragmentary view, in section, of a part of the spit assembly in Fig. 1;

Fig. 3 is an enlarged fragmentary view of a second embodiment of the invention.

Figure 1:
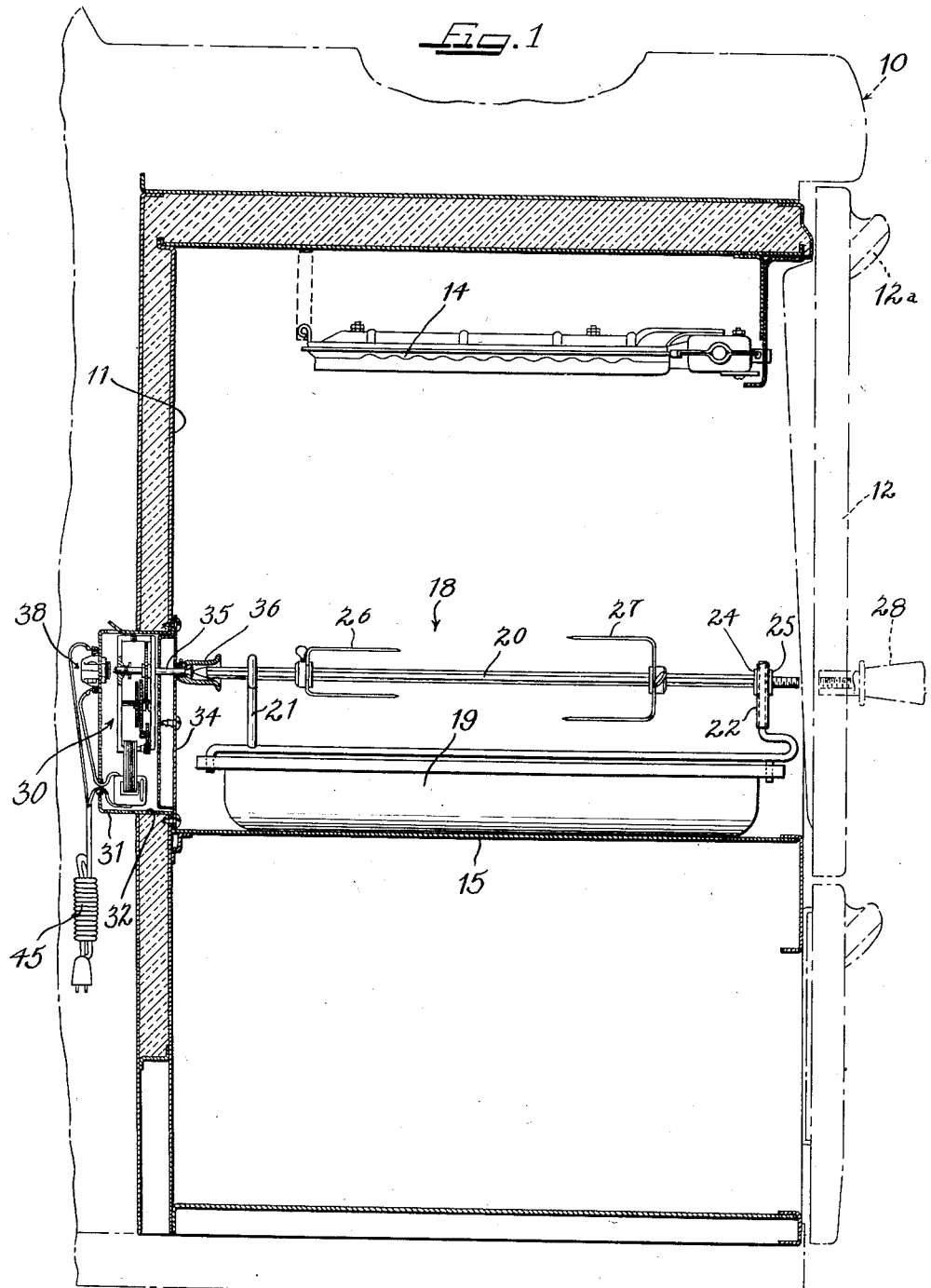
Figure 1 is a side elevation, partially in section, of a rotary spit assembly constructed in accordance with a preferred embodiment of the invention and shown as employed in the broiler oven of a domestic stove.

While the invention has been shown and is described in some detail with reference to particular embodiments thereof, there is no intention that it thus be limited to such detail. On the contrary, it is intended here to cover all modifications, alterations, and equivalents falling within the spirit and scope of the invention as defined in the appended claim.

Referring now to Fig. 1, a rotary spit assembly embodying the invention has been illustrated as employed with the oven of a domestic stove 10. The stove may be any one of a wide variety. That shown here for background purposes includes a broiler oven or compartment 11 which has the usual oven door 12 and a gas oven burner 14 located well above the compartment bottom partition 15. The door 12 may be hinged along its lower edge and provided with a handle 12a to facilitate opening and closing. The walls for the oven compartment are preferably formed by spaced sheets of steel between which insulating material is placed to retard the transfer of heat.

The rotary spit assembly comprises a unit 18 which is insertable into or removable from the oven 11 when the door 12 is open. For catching drippings and also serving as a base support, the unit 18 includes a broiler pan 19 which may be placed on and supported by the partition 15. A spit 20 is rotatably supported above the pan by a harness frame made of metal rod and adapted to be inserted through openings in the pan as shown. The frame includes a vertically extending cross bracket 21 bent to form a bight at its middle section for cradling and journaling the aft end of the spit 20. At its forward end, the frame includes a transverse sheet metal bracket 22 which is slotted at its midportion to cradle and journal the forward end of the spit. For preventing axial movement of the spit relative to the pan, a pair of spaced flanges 24, 25 on the spit are located to straddle the bracket 22. The spit may thus be lifted out of the cradle or frame but when supported therein as shown, it is freely rotatable.

The spit itself as here illustrated is pointed at its forward end to facilitate its passage through meat or other food. It is also formed of hexagonal cross section to facilitate driving connection therewith and to prevent relative rotation of food. For this latter purpose also, a pair of adjustable, opposed skewers 26, 27 may be slidably mounted on the spit and locked in selected axial positions by set screws. If desired, a handle 28 may be removably threaded onto the forward end of the spit 20 to enable the convenient manipulation of the latter as it is inserted through food articles and to facilitate sliding the unit 18 into or out of the oven after the loaded spit has been placed in the brackets 21 and 22. Preferably, the handle 28 is made of an insulating material, such as plastic, and is removed from the spit after the unit 18 is placed in the oven in order that the door 12 may be fully closed. When the unit is to be removed from the oven, the door is opened, the handle 28 screwed onto the spit, and the entire unit pulled from the oven.

For driving the spit when it is placed in the oven as shown, an electric gear motor 30 is mounted at the rear of the oven. The motor is contained in a suitable housing 31 which is adapted to be secured, as by self-tapping screws passed through a housing flange and into the oven wall, in an opening 32 in the rear wall of the oven 11. All of the ovens in a great number of mass-produced stoves may be provided with this opening 32 for receiving the gear motor housing 31 and in those ovens which are not to be equipped with the rotary spit assembly, the opening 32 may be closed by a coverplate 34. By this arrangement, a purchaser may elect to include or omit the spit assembly in his stove, and in the event the spit assembly is desired it is but a simple matter to loosen the coverplate 34 and fasten the gear motor housing in place as shown.

While the electric driving motor may take a variety of forms, that shown here by way of example is a shaded pole motor connected by suitable reduction gearing to an output shaft 35 extending forwardly into the oven at a point where it will be engaged with the rear end of the spit 20. Cooperating socketing formations on the shaft 35 and spit 20 automatically effect driving engagement between the two as the unit 18 is inserted into the oven. For this purpose, the forward end of the shaft 35 carries a rigidly attached or integral flared socket 36 which is hexagonal in cross section to mate wtih the spit 20.

In accordance with the present invention, means are provided for energizing the motor 30 when the unit 18 is inserted into the oven 11. A normally open switch is connected in circuit with motor and adapted to have its actuator shifted to close the switch by a part of the unit 18 as the latter reaches its fully inserted position. Conversely, when the unit 18 is withdrawn from the oven, the switch is re-opened and the motor de-energized.

In the preferred embodiment illustrated by Figs. 1 and 2, a normally open switch 38 is mounted in the rear wall of the housing 31 and adapted to be actuated, i. e., closed, by the spit 20 as the latter is moved into socketed engagement with the motor output shaft 35. As here shown, the switch 38 comprises a case 39 (Fig. 2) having a threaded neck 39a inserted through the housing 31 opposite the shaft 35 and secured by a nut 40. The case 39 mounts two insulated terminals 41, 42 carrying stationary contacts 43, 44 and adapted to be connected in series with one conductor of the usual power cord 45 for the motor 30. A movable contact ring 46 is disposed on a cap-like actuator 48 slidable in the neck portion 39a of the housing and biased to the right by a compression spring 49. The contact ring 46 is thus normally out of engagement with the stationary contacts 43, 44 so that the switch is open and the motor deenergized.

For closing the switch 38 in response to insertion of the spit 20 into the socket member 36, the output shaft 35 is formed with an axial bore or passage therethrough in which there is disposed an axially movable plunger 50 which has its right end terminating in the socket member 36 and its left end terminating adjacent the switch actuator 48. If desired, the plunger 50 may be independently biased to the right (Fig. 2) by a compression spring 51 bearing against a crosspiece 52 in the plunger which extends through diametrically opposed axial slots in the shaft 35. This serves also to limit the range of axial movement of the plunger 50 relative to the hollow shaft 35. It will be apparent that when the spit 20 is withdrawn from the socket member 36 both the plunger 50 and actuator 48 are shifted to the right so that the switch 38 is opened and the motor de-energized. On the other hand, as the spit 20 is inserted into socketed relation with the member 36, its forward point bears against the head of the plunger 50, shifting the latter to the left and, in turn, shifting the actuator 48 to the left so that the contact ring 46 connects the stationary contacts 43, 44 to thereby energize the motor.

From the foregoing, it is believed that the operation of the rotary spit assembly illustrated in Figs. 1 and 2 will be clear. In brief recapitulation, it may be observed that when the power cord 45 is plugged into a conventional voltage outlet the motor 30 will remain de-energized as long as the unit 18 is not placed in the oven 11. When the user has placed meat or other articles of food on the spit 20 and cradled the spit in the brackets 21 and 22 as shown, it is only necessary that he slide the unit 18 into the oven so that the pointed end of the spit 20 is drivingly socketed into the member 36. The switch 30 is then automatically closed and the motor energized to rotate the spit at some preselected speed, for example, three revolutions per minute. Heat from the burner 14 thus serves to uniformly roast or broil the food on the spit. It is not necessary for the user to close manually a switch in order to initiate the rotation of the spit. Conversely, when the food has been roasted, the unit 18 may be withdrawn from the oven whereupon the switch 38 is automatically opened and the motor 30 de-energized. The user is not burdened with remembering in each instance to either close a switch or open a switch to start or stop the motor.

The spit assembly described may be so proportioned that the plunger 50 is not shifted sufficiently to close the switch 38 until the oven door 12 is closed. That is, the oven door may be employed to bear against the forward end of the spit and thus shift the unit rearwardly as the door is closed, so that the switch 38 is only closed when the door is closed. Thus, when food is to be removed, the door may be opened and the motor automatically de-energized before the unit is actually withdrawn from the oven, the biasing springs 49 and 51 having sufficient strength to shift the unit forwardly and to open the switch when the oven door is opened. When the rotary spit assembly is not in use, the unit 18 may be stored in the oven without energizing the motor 30 simply by laying the spit 20 down in the pan 18 instead of placing it in the brackets 21 and 22.

Turning now to Fig. 3, a second embodiment of the invention is there shown, parts similar to those described above with reference to Figs. 1 and 2 being identified by the same reference characters. This second form of the invention differs principally from that previously described in that the spit 20 is not utilized to close the motor-controlling switch. Rather, a different part of the unit 18, namely, the rear edge of the drip pan 19, is cooperatively formed to actuate a motor-controlling switch as the unit is shifted fully into the oven.

As shown in Fig. 3, a switch 60 is mounted within the motor housing 31 and provided with a spring-biased actuator 61 which extends forwardly into the oven at a location such that it is engaged by a flange 19a on the rear edge of the pan 19 as the latter is fully inserted into the oven. The contacts (not visible) of the switch 60 are connected in series with the motor 30, as before, and the switch itself may be any one of a wide variety. Preferably, however, the switch 60 is of the snap-acting type in which the actuator 61 is depressed a first time to close the contacts, retraction of the pan and return of the actuator leaving the contacts closed. When the actuator 61 is depressed a second time, the switch contacts are opened. By employing such a snap-acting, double stroke switch, the pan 19 may retreat slightly from the actuator while cooking progresses. The oven door need not exert a continuous forward pressure on the pan, since once the user has shifted the pan inwardly to a degree sufficient to depress the actuator 61, the motor 30 will remain energized.

The operation of the modification shown in Fig. 3 is substantially the same as that previously described in connection with Figs. 1 and 2. When the spit 20 has been loaded with food and the unit 18 inserted into the oven at the beginning of the cooking operation, the user gives a slight inward push to the pan 19, causing it to shift the actuator 61 inwardly and to thus start the motor 30. Since the spit 20 is at this time socketed in the member 36, the food will be rotated as cooking progresses. The motor 30 remains energized without continued rearward force on the pan 19; and the latter may actually shift forwardly a small amount under the influence of the spring bias for the actuator 61, while the spit 20 and socket member 36 remain drivingly engaged owing to axial depth of the latter. When the cooking is completed, the user simply opens the oven door, pulls the pan 19 forwardly a slight amount to be sure the actuator 61 returns to its normal position, shifts the pan inwardly to depress the actuator a second time (thereby deenergizing the motor), and removes the pan, spit and food from the oven.

I claim:

In a broiler oven, the combination comprising a thick insulating rear wall having an aperture, a closed box-like housing proportioned to snugly fit within said aperture and provide a multi-wall closure for said aperture, a shaft rotatably supported within said housing and extending into said oven, coupling means on said shaft, a spit unit removably mounted in said oven for engagement with said coupling means upon insertion of the unit into the oven, an electric motor mounted within said housing and drivingly coupled with said shaft, a switch mounted within said housing and connected for controlling said motor, and a spring-biased actuator for said switch extending from said housing and positioned to be displaced by the unit as an incident to insertion of the latter into the oven and in driving engagement with said shaft, so that said switch is automatically actuated to energize said motor for rotating the spit when the unit is inserted into the oven.

References Cited in the file of this patent

UNITED STATES PATENTS

| | | |
|---|---|---|
| 1,718,961 | Humphrey | July 2, 1929 |
| 1,738,328 | Spielman | Dec. 3, 1929 |
| 1,981,010 | Torson | Nov. 20, 1934 |
| 2,019,170 | Barlow | Oct. 29, 1935 |
| 2,020,808 | Speakman | Nov. 12, 1935 |
| 2,040,214 | Ramirez et al. | May 12, 1936 |
| 2,282,866 | Hagen | May 12, 1942 |
| 2,284,155 | Landgraf | May 26, 1942 |
| 2,720,158 | Finizie | June 26, 1951 |